US011345090B2

(12) United States Patent
Yuwaki et al.

(10) Patent No.: US 11,345,090 B2
(45) **Date of Patent: *May 31, 2022**

(54) THREE-DIMENSIONAL SHAPING DEVICE AND METHOD FOR MEASURING VALUE RELATING TO DISTANCE

(71) Applicant: Seiko Epson Corporation, Tokyo (JP)

(72) Inventors: Kohei Yuwaki, Tsukuba (JP); Masayuki Gozu, Ina (JP); Koichi Saito, Matsumoto (JP)

(73) Assignee: Seiko Epson Corporation

( * ) Notice: Subject to any disclaimer, the term of this patent is extended or adjusted under 35 U.S.C. 154(b) by 0 days.

This patent is subject to a terminal disclaimer.

(21) Appl. No.: 16/910,137

(22) Filed: Jun. 24, 2020

(65) Prior Publication Data

US 2020/0406547 A1 Dec. 31, 2020

(30) Foreign Application Priority Data

Jun. 25, 2019 (JP) ............................ JP2019-116843

(51) Int. Cl.

| | |
|---|---|
| ***B29C 64/35*** | (2017.01) |
| ***B29C 64/209*** | (2017.01) |
| ***B29C 64/245*** | (2017.01) |
| ***B29C 64/393*** | (2017.01) |
| ***B29C 64/25*** | (2017.01) |
| ***B29C 64/232*** | (2017.01) |
| *B33Y 50/02* | (2015.01) |
| *B33Y 10/00* | (2015.01) |
| *B33Y 30/00* | (2015.01) |

(52) U.S. Cl.

CPC ............ *B29C 64/35* (2017.08); *B29C 64/209* (2017.08); *B29C 64/232* (2017.08); *B29C 64/245* (2017.08); *B29C 64/25* (2017.08); *B29C 64/393* (2017.08); *B33Y 10/00* (2014.12); *B33Y 30/00* (2014.12); *B33Y 50/02* (2014.12)

(58) Field of Classification Search

CPC .............................. B29C 64/232; B29C 64/25

See application file for complete search history.

(56) References Cited

U.S. PATENT DOCUMENTS

2017/0157828 A1 6/2017 Mandel et al.
2017/0210068 A1 * 7/2017 Kunioka ................ B33Y 10/00

(Continued)

FOREIGN PATENT DOCUMENTS

CN 108367491 A 8/2018
JP 2006-192710 A 7/2006

(Continued)

*Primary Examiner* — Alison L Hindenlang
*Assistant Examiner* — Asha A Thomas
(74) *Attorney, Agent, or Firm* — Harness, Dickey & Pierce, P.L.C.

(57) ABSTRACT

A three-dimensional shaping device includes a nozzle that discharges a shaping material from a discharge port formed on a tip end surface, a stage that includes a stacking surface on which the shaping material is stacked, a distance measurement mechanism that is disposed at a position facing the nozzle, a cleaning mechanism that cleans the tip end surface of the nozzle, and a control unit that controls the distance measurement mechanism to measure a value relating to a facing distance between the nozzle and the stacking surface after the cleaning mechanism cleans the tip end surface of the nozzle.

4 Claims, 7 Drawing Sheets

(56) References Cited

U.S. PATENT DOCUMENTS

2018/0017448 A1 1/2018 Heidemann et al.
2018/0178448 A1* 6/2018 Kakuta ................. B29C 64/393
2018/0370147 A1 12/2018 Peter et al.
2019/0001576 A1* 1/2019 Eller ..................... B29C 64/106

FOREIGN PATENT DOCUMENTS

JP 2017-217792 A 12/2017
JP 2018-103458 A 7/2018

* cited by examiner

THREE-DIMENSIONAL SHAPING DEVICE AND METHOD FOR MEASURING VALUE RELATING TO DISTANCE

The present application is based on, and claims priority from JP Application Serial Number 2019-116843, filed Jun. 25, 2019, the disclosure of which is hereby incorporated by reference herein in its entirety.

BACKGROUND

1. Technical Field

The present disclosure relates to a three-dimensional shaping device and a method for measuring a value relating to a distance.

2. Related Art

As a three-dimensional shaping device, a three-dimensional shaping device disclosed in JP-A-2017-217792 includes a mounting surface on which a shaping material is stacked, a nozzle that is disposed at a position facing the mounting surface and discharges the shaping material, and a distance detection unit for shaping. The distance detection unit for shaping detects a distance between the mounting surface and a tip end surface of the nozzle.

In the device disclosed in JP-A-2017-217792, when a foreign matter is adhered to the tip end surface of the nozzle, it is difficult to accurately detect the distance between the mounting surface and the tip end surface of the nozzle. When the detected distance is not accurate, shaping accuracy of the three-dimensional shaping device may be affected.

SUMMARY

According to an aspect of the present disclosure, a three-dimensional shaping device is provided. The three-dimensional shaping device includes a nozzle that discharges a shaping material from a discharge port formed on a tip end surface, a stage that includes a stacking surface on which the shaping material is stacked, a distance measurement mechanism that is disposed at a position facing the nozzle, a cleaning mechanism that cleans the tip end surface of the nozzle, and a control unit that controls the distance measurement mechanism to measure a value relating a facing distance between the nozzle and the stage after the cleaning mechanism cleans the tip end surface of the nozzle.

DESCRIPTION OF EXEMPLARY EMBODIMENTS

A. First Embodiment

Figure 1:
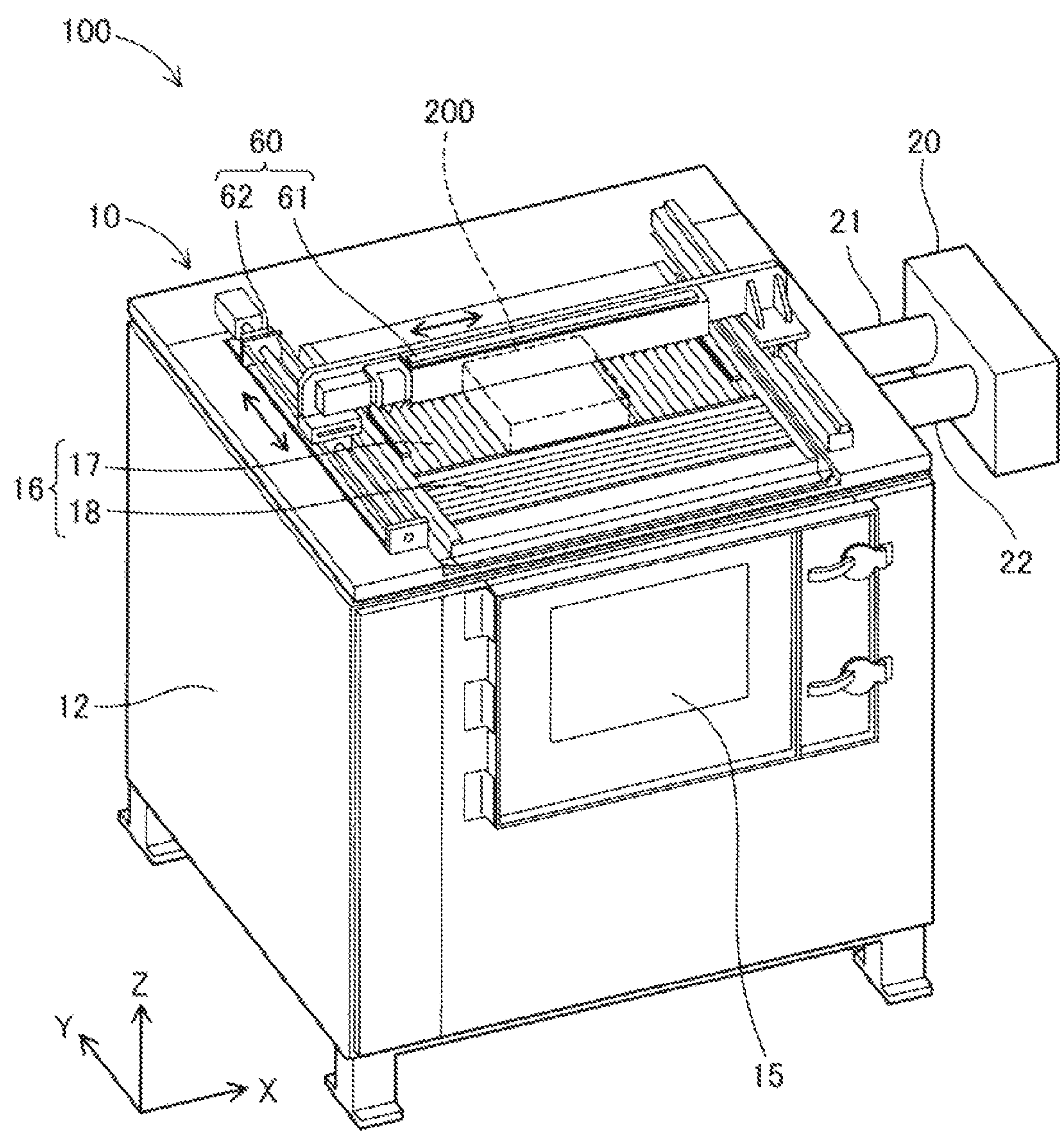
FIG. 1 is a perspective view showing an appearance of a three-dimensional shaping device according to a first embodiment.
Figure 2:
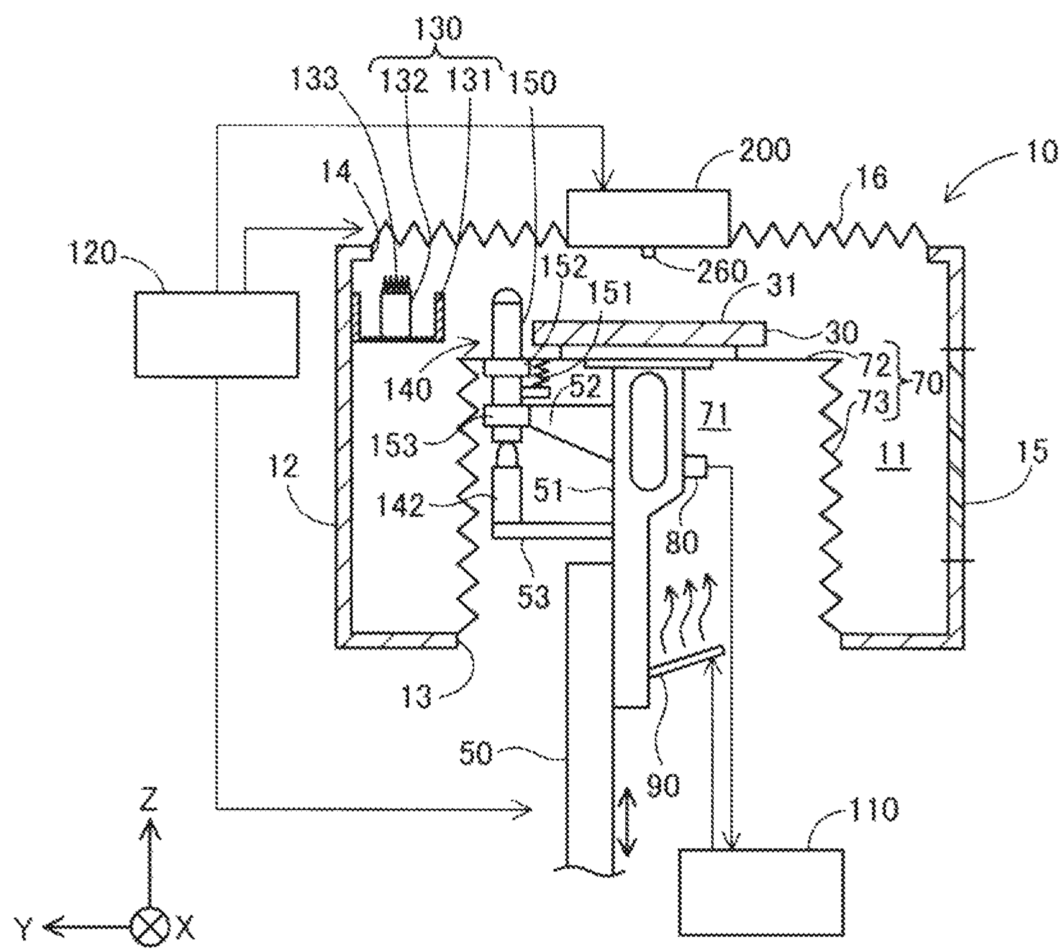
FIG. 2 is a schematic cross-sectional view showing an internal configuration of the three-dimensional shaping device.

FIG. 1 is a perspective view showing an appearance of a three-dimensional shaping device 100 according to the first embodiment. FIG. 2 is a schematic cross-sectional view showing an internal configuration of the three-dimensional shaping device 100. Arrows along an X direction, a Y direction, and a Z direction that are orthogonal to each other are shown in the figures. The X direction and the Y direction are directions along a horizontal direction and the Z direction is a direction along a vertical direction. The arrows along the X, Y, and Z directions are also appropriately shown in other figures.

As shown in FIGS. 1 and 2, the three-dimensional shaping device 100 includes a chamber 10, a heating unit 20, a stage 30, a discharge unit 200 including a nozzle 260, a first drive unit 50, a second drive unit 60, a first heat resistant member 70, a second heat resistant member 16, a temperature sensor 80, a cooling mechanism 90, a cooling control unit 110, a shaping control unit 120, a cleaning mechanism 130, and a distance measurement mechanism 140. The cooling control unit 110 and the shaping control unit 120 may be integrally formed.

The chamber 10 is internally provided with a shaping space 11 in which a three-dimensional shaped object is to be shaped. The chamber 10 includes a partition wall 12 surrounding the shaping space 11. The partition wall 12 is formed by disposing a thermal insulating material such as rock wool between an inner wall and an outer wall that are formed of a metal such as stainless steel. The partition wall 12 thermally insulates the shaping space 11 inside the chamber 10.

An opening and closing door 15 is provided on a part of the partition wall 12 and forms a side surface of the chamber 10. The opening and closing door 15 is configured with double glass or the like, so that a three-dimensional shaped object during shaping in the shaping space 11 can be visually recognized from the outside. The three-dimensional shaped object shaped in the shaping space 11 can be taken out to the outside by opening the opening and closing door 15. A first opening 13 is formed in the partition wall 12 and forms a lower surface of the chamber 10. A second opening 14 is formed in the partition wall 12 and faces the first opening 13 of the chamber 10.

The heating unit 20 is coupled to the chamber 10 through an intake pipe 21 and an exhaust pipe 22. The heating unit 20 adjusts a temperature of the shaping space 11 to a predetermined temperature by circulating and heating air in the shaping space 11 through the intake pipe 21 and the exhaust pipe 22. The heating unit 20 adjusts the temperature in the shaping space 11 to 120° C. to 150° C. in the present embodiment. The temperature is preferably higher than a glass transition point of a shaping material.

The stage 30 is disposed in the chamber 10. The stage 30 includes a stacking surface 31 exposed in the shaping space 11. The stage 30 may include a mechanism capable of adjusting an inclination or a height of the stacking surface 31. The stage 30 may include a heater for heating the stacking surface 31.

The first drive unit 50 changes a relative position between the nozzle 260 and the stage 30 along a first direction. The first direction is the vertical direction in the present embodiment. The first direction may be inclined in a range of, for example, ±10 degrees relative to the vertical direction. The first drive unit moves the stage 30 along the first direction in the present embodiment. The first drive unit 50 and the stage 30 are coupled by a prop 51 that forms a part of the first drive unit 50. In the present embodiment, the first drive unit 50 is provided with a linear actuator that includes a ball screw serving as a shaft member and a motor for driving the ball screw. The first drive unit 50 may be a mechanism that moves the nozzle 260 along the first direction, or may be a mechanism that moves both the nozzle 260 and the stage 30 along the first direction.

Figure 3:
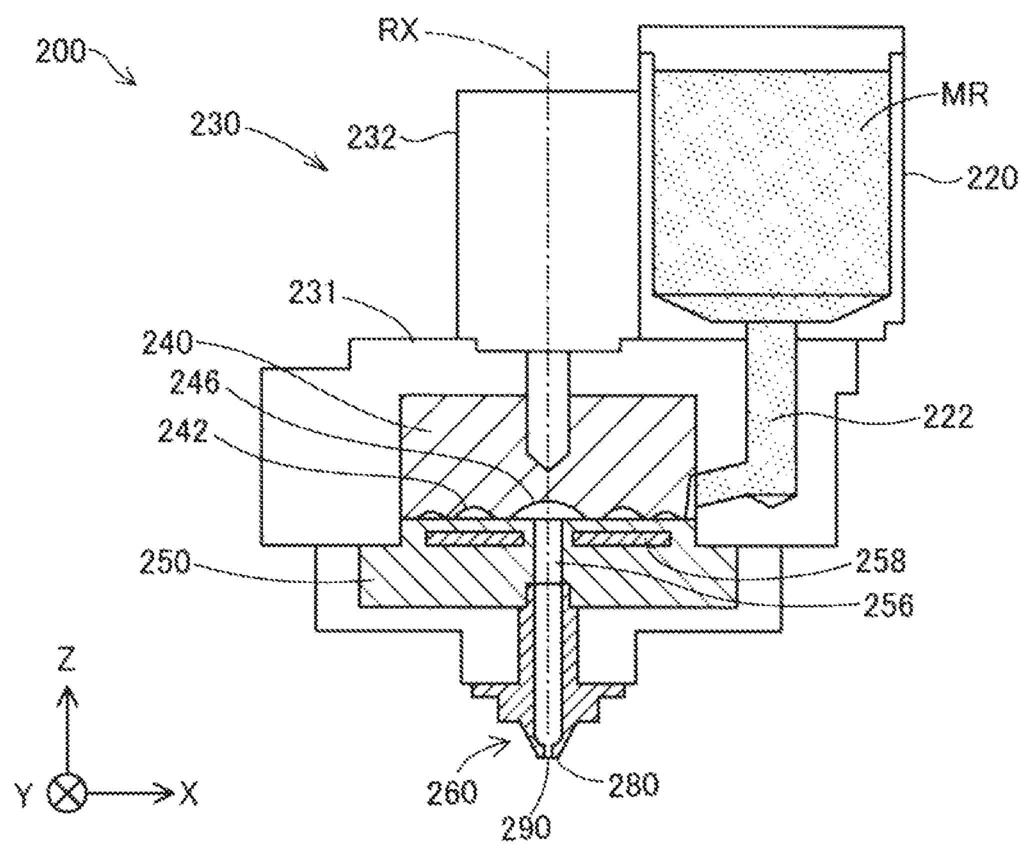
FIG. 3 is a schematic cross-sectional view showing a configuration of a discharge unit.

FIG. 3 is a schematic cross-sectional view showing a configuration of the discharge unit 200. The discharge unit 200 includes the nozzle 260. The discharge unit 200 discharges a shaping material from a discharge port 290 formed on a tip end surface 280 of the nozzle 260. In the shaping space 11 heated by the heating unit 20, the discharge unit 200 discharges the shaping material from the nozzle 260 towards the stacking surface 31 of the stage 30 while changing the relative position between the nozzle 260 and the stage 30 along a second direction intersecting the first direction, so as to shape a three-dimensional shaped object. The second direction is the horizontal direction in the present embodiment. The discharge unit 200 is also referred to as a head. A specific configuration of the discharge unit 200 will be described later. In the present embodiment, since the discharge unit 200 discharges the shaping material inside the heated chamber 10, adhesion between shaping materials on the stacking surface 31 can be improved and warp due to rapid cooling of the shaping material can be prevented from occurring. The second direction may be inclined in a range of, for example, ±10 degrees relative to the first direction.

The second drive unit 60 changes a relative position between the nozzle 260 and the stage 30 along the second direction. The second drive unit 60 moves the discharge unit 200 in the horizontal direction in the present embodiment. The second drive unit 60 is disposed at a position away from the shaping space 11. The second drive unit 60 is provided on an upper surface of the chamber 10 in the present embodiment. In the present embodiment, the second drive unit 60 includes a first linear actuator 61 that moves the discharge unit 200 along the X direction, and a second linear actuator 62 that moves the discharge unit 200 along the Y direction. Each of the first linear actuator 61 and the second linear actuator 62 includes a ball screw and a motor for driving the ball screw. The second linear actuator 62 performs drive along a pair of rails disposed along the Y direction so as to sandwich, in the X direction, the second opening 14 that opens on the upper surface of the chamber 10. The long first linear actuator 61 is set across the rails in the X direction, and the discharge unit 200 is attached to the first linear actuator 61. The second drive unit 60 includes a linear actuator that moves the stage 30 along the X direction, and a linear actuator that moves the stage 30 along the Y direction, and may move the stage 30 along the second direction. Alternatively, the second drive unit 60 may move both the nozzle 260 and the stage 30 along the second direction.

The first opening 13 is formed in the lower surface of the chamber 10. The first heat resistant member 70 is disposed between a peripheral portion of the first opening 13 and the stage 30.

Figure 4:
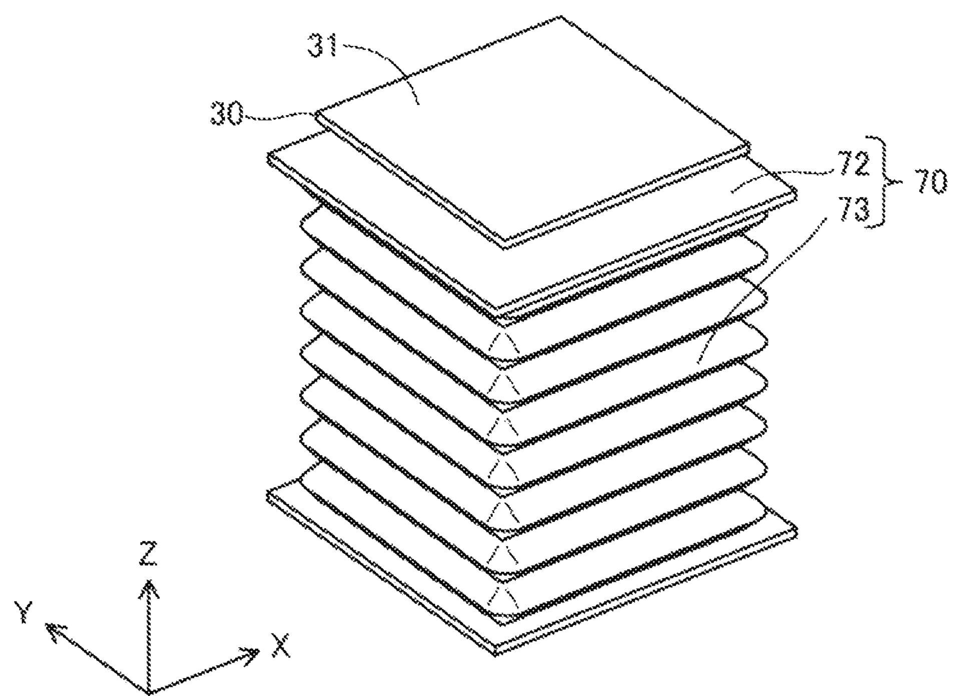
FIG. 4 is a perspective view showing an appearance structure of a first heat resistant member.

FIG. 4 is a perspective view showing an appearance structure of the first heat resistant member 70. The first heat resistant member 70 includes an upper wall 72 on which the stage 30 is mounted, and a bellows portion 73 that is positioned below the upper wall 72 and is expandable or contractible along the Z direction. The bellows portion 73 expands or contracts corresponding to a movement of the stage 30 along the Z direction. The bellows portion 73 is formed into a cylindrical shape. The bellows portion 73 and the upper wall 72 form a separation space 71 separated from the shaping space 11. A part of the first drive unit 50 that drives the stage 30 is disposed in the separation space 71. The prop 51 that forms a part of a tip end portion of the first drive unit 50 is disposed in the separation space 71 in the present embodiment. Alternatively, the entire first drive unit 50 may be disposed in the separation space 71. The first heat resistant member 70 has heat resistance that can resist the temperature in the shaping space 11. The first heat resistant member 70 is formed by coating silicone onto a woven fabric of glass fibers in the present embodiment. The configuration of the first heat resistant member 70 is not limited thereto, and may be formed by coating a fluorine resin or the like instead of silicone onto the woven fabric of glass fibers.

As shown in FIG. 2, the second opening 14 is formed in an upper portion of the chamber 10. The discharge unit 200 is disposed in the second opening 14. A second heat resistant member 16 is disposed between a peripheral portion of the second opening 14 and the discharge unit 200.

The second heat resistant member 16 has a structure that expands or contracts in the horizontal direction corresponding to a movement of the discharge unit 200 in the horizontal direction. The second heat resistant member 16 includes a first cover 17 expanding or contracting in the X direction and a second cover 18 expanding or contracting in the Y direction. Similar to the first heat resistant member 70, the first cover 17 and the second cover 18 have heat resistance that can resist the temperature in the shaping space 11, and have a bellows-like telescopic structure in the present embodiment.

As shown in FIG. 2, the temperature sensor 80 is disposed in the separation space 71 inside the first heat resistant member 70. The temperature sensor 80 is a sensor that measures a temperature of the separation space 71. The temperature sensor 80 is attached to the prop 51 in the present embodiment.

The cooling mechanism 90 cools the separation space 71. The cooling mechanism 90 is implemented by a cooling fan in the present embodiment. The cooling mechanism 90 is disposed in a lower portion of the separation space 71, and blows air towards the separation space 71. A lower side of the first heat resistant member 70 is opened. The air introduced into the separation space 71 by the cooling mechanism 90 is discharged to the outside from the lower side of the separation space 71. The cooling mechanism 90 may be a mechanism that suctions air in the separation space 71 and discharges the air to the outside. The cooling mechanism 90 is not limited to the cooling fan, and may be implemented by, for example, disposing a pipe through which a refrigerant flows in the separation space 71.

The cooling control unit 110 controls the cooling mechanism 90 in accordance with the temperature of the separation space 71 measured by the temperature sensor 80. More specifically, the cooling control unit 110 performs a feedback control on the cooling mechanism 90 to adjust the temperature in the separation space 71 such that the temperature of the separation space 71 measured by the temperature sensor 80 becomes a target temperature. The cooling control unit 110 sets the target temperature to 50° C. to 60° C. in the present embodiment. The target temperature is equal to or lower than a heat resistant temperature of the first drive unit 50, and is set as a temperature at which a movement error due to thermal strain of the stage 30 moved by the first drive unit 50 in the vertical direction falls within a predetermined range. The cooling control unit 110 may be implemented by a circuit, or may be implemented by a computer.

The shaping control unit 120 controls the discharge unit 200, the first drive unit 50, and the second drive unit 60 according to three-dimensional shaping data acquired from a recording medium, an external computer, or the like, so that the shaping material is discharged to a specified position on the stacking surface 31 of the stage 30 to shape a three-dimensional shaped object. The shaping control unit 120 is implemented by a computer, and includes one or more processors, a memory, and an input and output interface that inputs a signal from the outside and outputs a signal to the outside. The processor executes a predetermined program stored in the memory to implement a shaping processing to shape the three-dimensional shaped object. Some or all functions of the shaping control unit 120 may be implemented by a circuit. The shaping control unit 120 is simply referred to as a control unit.

As shown in FIG. 2, the cleaning mechanism 130 includes a box-shaped waste material storing portion 131 having an opening on an upper surface, and a cleaning member 132 disposed in the waste material storing portion 131. The waste material storing portion 131 and the cleaning member 132 are disposed inward than the partition wall 12 that forms the shaping space 11. The cleaning member 132 includes a contact portion 133 that can be in contact with the tip end surface 280 of the nozzle 260. The contact portion 133 is a brush-like member in the present embodiment. The contact portion 133 is not limited to the brush-like member, and may be a spatula-like member.

The shaping control unit 120 controls the second drive unit 60 to clean the tip end surface 280 of the nozzle 260 in the present embodiment. Specifically, the shaping control unit 120 controls the second drive unit 60 to move the nozzle 260 provided in the discharge unit 200 on the cleaning member 132 and scrape the tip end surface 280 of the nozzle 260 with the contact portion 133 of the cleaning member 132, so that a shaping material adhered to the tip end surface 280 of the nozzle 260 is removed from the tip end surface 280 of the nozzle 260 and collected by the waste material storing portion 131.

Vickers hardness of the contact portion 133 of the cleaning member 132 is smaller than Vickers hardness of the tip end surface 280 of the nozzle 260. The contact portion 133 of the cleaning member 132 is formed of SUS and the nozzle 260 is formed of alloy tool steel in the present embodiment. The nozzle 260 is not limited thereto, and may be formed of brass or the like. The Vickers hardness of the contact portion 133 of the cleaning member 132 is smaller than the Vickers hardness of the tip end surface 280 of the nozzle 260, so that the tip end surface 280 of the nozzle 260 can be prevented from being broken when the contact portion 133 of the cleaning member 132 and the tip end surface 280 of the nozzle 260 are brought into contact with each other.

As shown in FIG. 2, the distance measurement mechanism 140 includes a gauge head 150 and a gauge head movement amount detection unit 142.

The gauge head movement amount detection unit 142 is provided in the separation space 71. In the present embodiment, the gauge head movement amount detection unit 142 is a shaft-shaped contact displacement sensor, and detects a pushing amount of the tip end portion by a differential transformer. The gauge head movement amount detection unit 142 is fixed to the prop 51 via a second fixture 53 whose one end is fixed to the prop 51, with the tip end portion of the gauge head movement amount detection unit 142 directing towards the +Z direction.

The gauge head 150 has a shaft shape. A tip end portion of the gauge head 150 protrudes from a hole provided in the upper wall 72 of the first heat resistant member 70 towards the shaping space 11 in the +Z direction. The tip end portion of the gauge head 150 includes a portion in contact with the tip end surface 280 of the nozzle 260 which will be described later. An end portion of the tip end portion of the gauge head 150 at a nozzle 260 side is disposed between the stacking surface 31 and the tip end surface 280 of the nozzle 260 in the Z direction. The gauge head 150 is fixed to the upper wall 72 via a telescopic portion 151 whose one end is fixed to a lower surface of the upper wall 72. The telescopic portion 151 is formed of a spring and can expand or contract along the Z direction. The telescopic portion 151 biases the gauge head 150 upward.

The gauge head 150 includes a flange portion 152. An outer diameter of the flange portion 152 is larger than a diameter of the hole provided in the upper wall 72 through which the gauge head 150 is inserted. In a state in which the telescopic portion 151 does not expand, an upper surface of the flange portion 152 is in contact with an upper portion of the first heat resistant member 70 with an O-ring interposed therebetween in the −Z direction in the present embodiment. Accordingly, heated air can be prevented from leaking from the shaping space 11 to the separation space 71 through the hole provided in the upper wall 72.

The gauge head 150 is slidably inserted into a guide portion 153 that has a substantially cylindrical shape and is provided on the prop 51 via a first fixture 52. The guide portion 153 allows a movement of the gauge head 150 in the first direction and restricts the gauge head 150 to move in the second direction.

Operation of the gauge head 150 and the gauge head movement amount detection unit 142 according to the present embodiment will be described. When an upper end of the gauge head 150 is in contact with the tip end surface 280 of the nozzle 260 and the upper end of the gauge head 150 is relatively pushed from the +Z direction, the gauge head 150 moves in the −Z direction. The tip end portion of the gauge head movement amount detection portion 142 is pushed by the gauge head 150 that moves in the −Z direction, and the gauge head movement amount detection portion 142 detects a pushing amount. The gauge head movement amount detection unit 142 converts the pushing amount into an electrical signal and the shaping control unit 120 reads the electrical signal.

Vickers hardness of the gauge head 150 is smaller than Vickers hardness of the nozzle 260. More specifically, the Vickers hardness of the portion of the gauge head 150 that is in contact with the tip end surface 280 of the nozzle 260 is smaller than the Vickers hardness of the tip end surface 280 of the nozzle 260. The gauge head 150 is formed of SUS and the nozzle 260 is formed of alloy tool steel in the present embodiment. The nozzle 260 is not limited thereto, and may be formed of brass or the like. The Vickers hardness of the gauge head 150 is smaller than the Vickers hardness of the nozzle 260, so that the nozzle 260 can be prevented from being broken when the gauge head 150 and the nozzle 260 are brought into contact with each other.

The gauge head 150 is moved by a gauge head moving mechanism that moves the gauge head 150. The first drive unit 50 functions as the gauge head moving mechanism in the present embodiment. That is, the first drive unit 50 moves the stage 30 along the first direction, thereby moving the gauge head 150 fixed to the stage 30 along the first direction. The shaping control unit 120 controls the first drive unit 50 and the second drive unit 60 to measure a facing distance as a value relating to a facing distance between the tip end surface 280 of the nozzle 260 and the stacking surface 31. The facing distance is a distance between the tip end surface 280 of the nozzle 260 and the stacking surface 31. A method for measuring the facing distance will be described later in detail.

As shown in FIG. 3, the discharge unit 200 includes a material supply unit 220 that serves as a supply source of a material MR before the material MR is converted into a shaping material, a material melting unit 230 that melts the material MR into the shaping material, and the nozzle 260 that discharges the shaping material towards the stacking surface 31.

The material supply unit 220 supplies the material MR for generating the shaping material to the material melting unit 230. The material supply unit 220 is implemented by, for example, a hopper that stores the material MR. The material supply unit 220 is coupled to the material melting unit 230 via a communication path 222. The material MR is put into the material supply unit 220 in a form of pellet, powder, or the like. The material MR will be described later in detail.

The material melting unit 230 plasticizes the material MR supplied from the material supply unit 220 to generate a paste-like shaping material having flowability, and guides the shaping material to the nozzle 260. The material melting unit 230 includes a screw case 231, a drive motor 232, a flat screw 240, and a screw facing portion 250. The flat screw 240 is also referred to as a "scroll". The screw facing portion 250 is also referred to as a "barrel". The material melting unit 230 may not have to melt all kinds of materials constituting the shaping material. The material melting unit 230 may convert the shaping material into a state in which the whole shaping material has flowability by melting at least a part of materials among the materials constituting the shaping material.

The flat screw 240 has a substantially cylindrical shape whose height along a central axis RX of the flat screw 240 is smaller than a diameter. The flat screw 240 is disposed such that the central axis RX thereof is parallel to the Z direction in the present embodiment.

The flat screw 240 is accommodated in the screw case 231. An upper surface side of the flat screw 240 is coupled to the drive motor 232, and the flat screw 240 is rotated about the central axis RX in the screw case 231 by a rotation drive force generated by the drive motor 232. The drive motor 232 is driven under control of the shaping control unit 120.

A groove portion 242 is formed in a lower surface of the flat screw 240. The communication path 222 of the material supply unit 220 described above communicates with the groove portion 242 from a side surface of the flat screw 240.

The lower surface of the flat screw 240 faces an upper surface of the screw facing portion 250. A space is formed between the groove portion 242 on the lower surface of the flat screw 240 and the upper surface of the screw facing portion 250. The material MR is supplied from the material supply unit 220 into the space. A specific configuration of the flat screw 240 and the groove portion 242 will be described later.

A heater 258 for heating the material MR is embedded in the screw facing portion 250. The material MR supplied to the groove portion 242 of the flat screw 240 is melted in the groove portion 242, flows along the groove portion 242 by rotation of the flat screw 240, and is guided to a central portion 246 of the flat screw 240 as the shaping material. The paste-like shaping material flowing into the central portion 246 is supplied to the nozzle 260 via a communication hole 256 provided at a center of the screw facing portion 250.

The nozzle 260 is coupled to the communication hole 256 of the screw facing portion 250. The nozzle 260 discharges the shaping material generated in the material melting unit 230 from the discharge port 290 formed on the tip end surface 280 towards the stacking surface 31.

Figure 5:
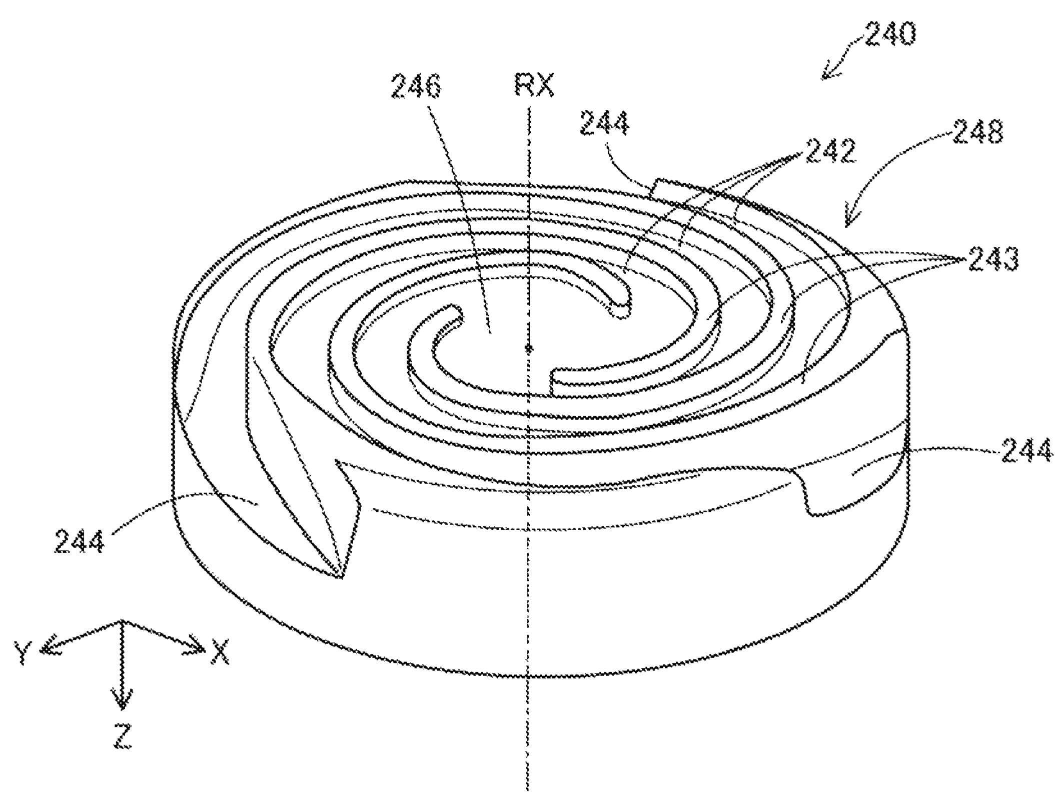
FIG. 5 is a schematic perspective view showing a configuration of a lower surface side of a flat screw.

FIG. 5 is a schematic perspective view showing a configuration of a lower surface side of the flat screw 240. A position of the central axis RX of the flat screw 240 is indicated by a dash-dot line in FIG. 5. The groove portion 242 is provided in the lower surface of the flat screw 240 that faces the screw facing portion 250. Hereinafter, the lower surface of the flat screw 240 will be referred to as a "groove forming surface 248".

The central portion 246 of the groove forming surface 248 of the flat screw 240 is formed to be a recess portion to which one end of the groove portion 242 is coupled. The central portion 246 faces the communication hole 256 of the screw facing portion 250. The central portion 246 intersects the central axis RX in the first embodiment.

The groove portion 242 of the flat screw 240 forms a so-called scroll groove. The groove portion 242 extends in a vortex shape from the central portion 246 so as to draw arcs towards an outer periphery of the flat screw 240. The groove portion 242 may extend spirally. The groove forming surface 248 is provided with a ridge portion 243 that forms a side wall portion of the groove portion 242 and extends along each groove portion 242.

The groove portion 242 is continuous up to a material inlet 244 formed on a side surface of the flat screw 240. The material inlet 244 receives the material MR supplied via the communication path 222 of the material supply unit 220.

FIG. 5 shows an example of the flat screw 240 including three groove portions 242 and three ridge portions 243. The number of the groove portions 242 or the ridge portions 243 provided in the flat screw 240 is not limited to three. The flat screw 240 may be provided with only one groove portion 242, or two or more groove portions 242. Any number of the ridge portions 243 may be provided in accordance with the number of the groove portions 242.

FIG. 5 shows an example of the flat screw 240 in which three material inlets 244 are formed. The number of the material inlets 244 provided in the flat screw 240 is not limited to three. The flat screw 240 may be provided with only one material inlet 244, or two or more material inlets 244.

Figure 6:
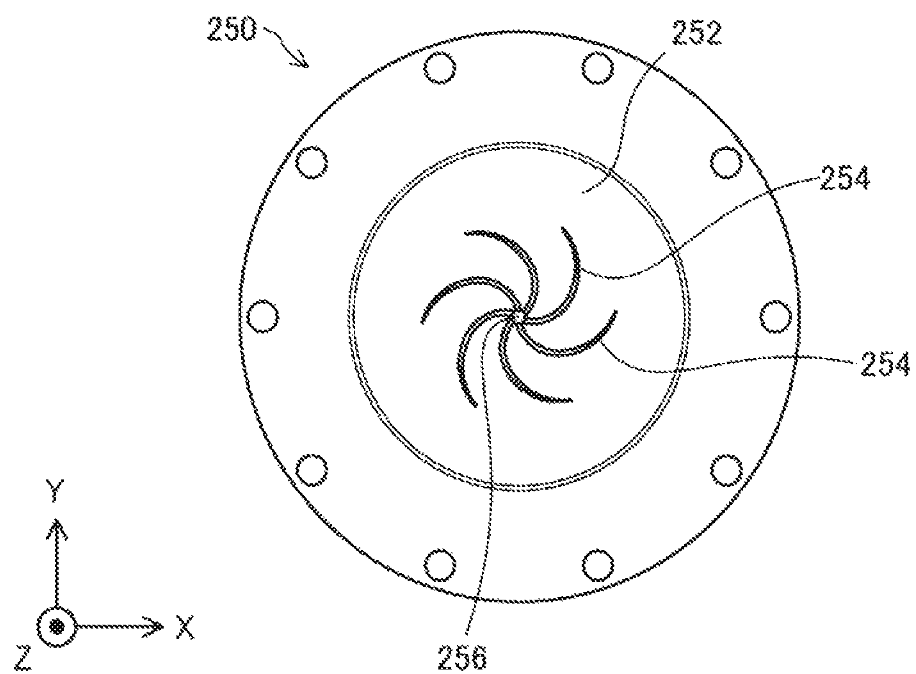
FIG. 6 is a schematic plan view showing a configuration of an upper surface side of a screw facing portion.

FIG. 6 is a schematic plan view showing a configuration of an upper surface side of the screw facing portion 250. As described above, the upper surface of the screw facing portion 250 faces the groove forming surface 248 of the flat screw 240. Hereinafter, the upper surface of the screw facing portion 250 is referred to as a "screw facing surface 252".

The communication hole 256 for supplying the shaping material to the nozzle 260 is formed at the center of the screw facing surface 252.

A plurality of guide grooves 254 that are coupled to the communication hole 256 and extend in a vortex shape from the communication hole 256 towards an outer periphery are formed on the screw facing surface 252. The plurality of guide grooves 254 have a function of guiding the shaping material flowing into the central portion 246 of the flat screw 240 to the communication hole 256.

When the flat screw 240 is rotated, the material MR supplied from the material inlet 244 is guided into the groove portion 242 and moves towards the central portion 246 while being heated in the groove portion 242. As the material MR moves close to the central portion 246, the material MR is melted, flowability of the material MR increases, and the material MR is converted into the shaping material. The shaping material collected in the central portion 246 flows from the communication hole 256 to the nozzle 260 due to an internal pressure generated in the central portion 246.

Figure 7:
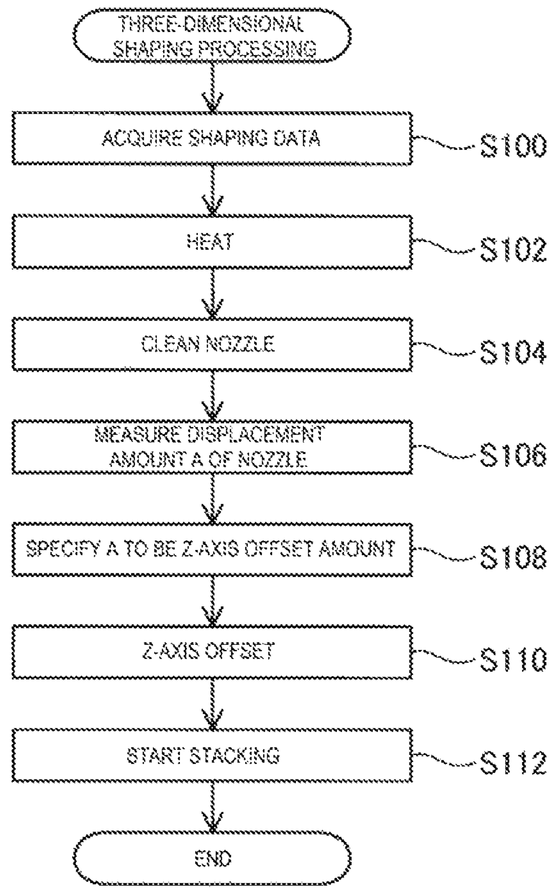
FIG. 7 is a diagram showing steps of a three-dimensional shaped object manufacturing method according to the first embodiment.

FIG. 7 is a diagram showing steps of a three-dimensional shaped object manufacturing method according to the first embodiment. In the present embodiment, the shaping control unit 120 executes a shaping program for creating a three-dimensional shaped object to manufacture the three-dimensional shaped object. First, the shaping control unit 120 acquires shaping data used for shaping the three-dimensional shaped object in step S100. The shaping data is, for example, tool path data obtained by converting data in an STL format or an AMF format that indicates a shape of the three-dimensional shaped object by a slicer. The shaping data may include a head temperature, a stage temperature, and an in-chamber temperature. Alternatively, for example, a user may set these temperatures individually.

In step S102, the shaping control unit 120 controls the heating unit 20 to heat an inside of the chamber 10 up to a predetermined temperature. At this time, the shaping control unit 120 may control the heater 258 to heat the discharge unit 200 up to a predetermined temperature. When the stage 30 is provided with a heater, the shaping control unit 120 may control the heater provided on the stage 30 to heat the stage 30.

In step S104, the shaping control unit 120 controls the second drive unit 60 to bring the cleaning member 132 and the tip end surface 280 of the nozzle 260 into contact with each other to clean the tip end surface 280 of the nozzle 260.

In step S106, the shaping control unit 120 controls the first drive unit 50 and the second drive unit 60 to measure a displacement amount A of the nozzle 260. The displacement amount A of the nozzle 260 is a difference between a predetermined distance L0 between the nozzle 260 and the stacking surface 31 in the Z direction and a facing distance L1 measured by the distance measurement mechanism 140 controlled by the shaping control unit 120.

Figure 8:
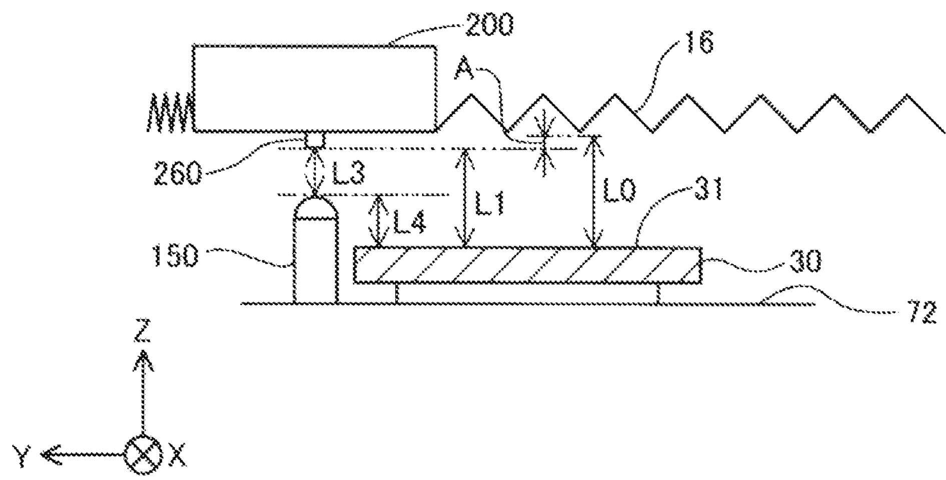
FIG. 8 is a diagram showing a method for measuring a displacement amount of a nozzle.

FIG. 8 is a diagram showing a method for measuring the displacement amount A of the nozzle 260 in step S106 described above. First, the shaping control unit 120 controls the second drive unit 60 to move the discharge unit 200 along the second direction to a position where the tip end surface 280 of the nozzle 260 faces an upper end of the gauge head 150. Thereafter, the shaping control unit 120 controls the first drive unit 50 to move the distance measurement mechanism 140 to a reference position in the first direction. The reference position in the first direction is, for example, a position where a coordinate of the stage 30 in the Z direction is recognized as 0 by the shaping control unit 120. Thereafter, the shaping control unit 120 controls the first drive unit 50 to move the gauge head 150 towards the nozzle 260 until the gauge head 150 is pressed by the tip end surface 280 of the nozzle 260. The shaping control unit 120 calculates, as a distance L3, a movement distance of the gauge head 150 from the reference position in the first direction to a position where the tip end surface 280 of the nozzle 260 is in contact with the gauge head 150. Specifically, a value obtained by subtracting a movement amount of the gauge head 150 in the −Z direction that is detected by the gauge head movement amount detection unit 142 from a movement amount of the stage 30 is calculated as the distance L3.

The shaping control unit 120 calculates, as the facing distance L1, a value obtained by adding a distance L4 between the stacking surface 31 and an upper end surface of the gauge head 150 in the Z direction to the distance L3. The distance L4 is pre-measured, for example, at the time of factory shipment of the three-dimensional shaping device 100, and is recorded in a memory.

The shaping control unit 120 records in the memory, as the displacement amount A of the nozzle 260, a value obtained by subtracting the predetermined distance L0 between the tip end surface 280 of the nozzle 260 and the stacking surface 31 from the facing distance L1. The distance L0 is a value preset at the time of designing the three-dimensional shaping device 100.

The shaping control unit 120 specifies the displacement amount A to be a Z-axis offset amount in step S108. The shaping control unit 120 performs a Z-axis offset in step S110. The Z-axis offset refers to that the shaping control unit 120 changes the reference position of the stage 30 in the Z direction based on the displacement amount A specified in step S108. In the present embodiment, the shaping control unit 120 controls the first drive unit 50 to move the stage 30 based on the displacement amount A, and records in the memory a position of the stage 30 after movement as a new reference position in the Z direction.

In step S112, the shaping control unit 120 controls the drive motor 232, the first drive unit 50, and the second drive unit 60 while discharging the shaping material from the nozzle 260 towards the stacking surface 31, to shape the three-dimensional shaped object.

According to the three-dimensional shaping device 100 in the present embodiment described above, the shaping control unit 120 measures the facing distance between the tip end surface 280 of the nozzle 260 and the stacking surface 31 after the cleaning mechanism 130 cleans the tip end surface 280 of the nozzle 260. Therefore, the facing distance can be accurately measured.

In the present embodiment, the shaping control unit 120 controls the first drive unit 50 and the second drive unit 60 to bring the gauge head 150 into contact with the tip end surface 280 of the nozzle 260 to measure the facing distance. Therefore, the facing distance can be accurately measured by a simple configuration.

In the present embodiment, the end portion at the nozzle 260 side of the gauge head 150 is disposed between the stacking surface 31 and the tip end surface 280 of the nozzle 260 in the Z direction. Therefore, the nozzle 260 can be prevented from coming into contact with the stage 30 when the facing distance is measured. Accordingly, the facing distance can be accurately measured.

In the present embodiment, the tip end portion of the gauge head 150 is disposed in the shaping space 11, and the gauge head movement amount detection unit 142 is disposed in the separation space 71 that is separated from the shaping space 11 by the cylindrical first heat resistant member 70. Accordingly, the gauge head movement amount detection unit 142 can be prevented from being thermally affected. Therefore, the facing distance can be accurately measured.

In the present embodiment, the Vickers hardness of the contact portion 133 of the cleaning member 132 is smaller than the Vickers hardness of the tip end surface 280 of the nozzle 260. Therefore, the tip end surface 280 of the nozzle 260 can be prevented from being broken when the contact portion 133 of the cleaning member 132 and the tip end surface 280 of the nozzle 260 are brought into contact with each other.

Here, a material of the three-dimensional shaped object used in the three-dimensional shaping device 100 described above will be described. In the three-dimensional shaping device 100, various materials such as a thermoplastic material, a metal material, and a ceramic material can be used as a main material to shape the three-dimensional shaped object. Here, the "main material" refers to a material serving as a main component used for forming a shape of the three-dimensional shaped object or refers to a material having content of 50 wt % or more in the three-dimensional shaped object. The above-described shaping material includes a material obtained by melting the main material alone or by melting the main material and a part of components contained in the main material into a paste form.

When the thermoplastic material is used as the main material, the shaping material is generated by plasticizing the material in the material melting unit 230. "Plasticize" refers to that the thermoplastic material is heated and melted.

Examples of the thermoplastic material may include the following thermoplastic resin materials.

Example of Thermoplastic Resin Material

General-purpose engineering plastics such as polypropylene resin (PP), polyethylene resin (PE), polyacetal resin (POM), polyvinyl chloride resin (PVC), polyamide resin (PA), acrylonitrile-butadiene-styrene resin (ABS), polylactic acid resin (PLA), polyphenylene sulfide resin (PPS), polyether ether ketone (PEEK), polycarbonate (PC), modified polyphenylene ether, polybutylene terephthalate, and polyethylene terephthalate, and engineering plastics such as polysulfone, polyether sulfone, polyphenylene sulfide, polyarylate, polyimide, polyamideimide, polyetherimide, and polyether ether ketone Additives such as a pigment, a metal, a ceramic, wax, a flame retardant, an antioxidant, and a heat stabilizer may be mixed into the thermoplastic material. The thermoplastic material is converted into a state of being plasticized and melted by rotation of the flat screw 240 and heating of the heater 258 in the material melting unit 230. The shaping material generated by melting the thermoplastic material is cured by a decrease in temperature after being discharged from the nozzle 260.

It is desirable that the thermoplastic material is emitted from the nozzle 260 in a state of being heated at a temperature equal to or higher than a glass transition point of the thermoplastic material and being completely melted. For example, a glass transition point of the ABS resin is about 120° C. It is desirable that the ABS resin is emitted from the nozzle 260 at about 200° C. In order to emit the shaping material in such a high temperature state, a heater may be provided around the nozzle 260.

The following metal materials, for example, may be used as the main material in the three-dimensional shaping device 100 instead of the above-described thermoplastic materials. In this case, it is desirable that the following metal material is formed into a powder material, a component melted at the time of generating the shaping material is mixed with the powder material, and then the mixed material is added into the material melting unit 230 as the material MR.

Example of Metal Material

A single metal such as magnesium (Mg), iron (Fe), cobalt (Co), chromium (Cr), aluminum (Al), titanium (Ti), copper (Cu), and nickel (Ni), or an alloy containing one or more of these metals Example of Alloy Maraging steel, stainless steel, cobalt chromium molybdenum, titanium alloy, nickel alloy, aluminum alloy, cobalt alloy, and cobalt chromium alloy A ceramic material may be used as the main material in the three-dimensional shaping device 100 instead of the above-described metal material. Examples of the ceramic material may include oxide ceramics such as silicon dioxide, titanium dioxide, aluminum oxide, zirconium oxide, and non-oxide ceramics such as aluminum nitride. When the above-described metal material or ceramic material is used as the main material, the shaping material discharged onto the stacking surface 31 may be cured by sintering.

A powder material of the metal material or the ceramic material to be charged into the material supply unit 220 as the material MR may be a mixed material obtained by mixing a plurality of types of powders including a powder of a single metal or a powder of an alloy and a powder of a ceramic material. The powder material of the metal material or the ceramic material may be coated with, for example, the thermoplastic resin as illustrated in the above-described example, or a thermoplastic resin other than the above thermoplastic resin. In this case, the thermoplastic resin may be melted in the material melting unit 230 to exhibit flowability.

The following solvents, for example, may be added to the powder material of the metal material or the ceramic material to be charged into the material supply unit 220 as the material MR. One solvent or a combination of two or more solvents selected from the following solvents may be used.

Example of Solvent

Water, (poly)alkylene glycol monoalkyl ethers such as ethylene glycol monomethyl ether, ethylene glycol monoethyl ether, propylene glycol monomethyl ether, and propylene glycol monoethyl ether, acetates such as ethyl acetate, n-propyl acetate, iso-propyl acetate, n-butyl acetate, and iso-butyl acetate, aromatic hydrocarbons such as benzene, toluene, and xylene, ketones such as methyl ethyl ketone, acetone, methyl isobutyl ketone, ethyl-n-butyl ketone, diisopropyl ketone, and acetylacetone, alcohols such as ethanol, propanol, and butanol, tetraalkylammonium acetates, sulfoxide-based solvents such as dimethyl sulfoxide and diethyl sulfoxide, pyridine-based solvents such as pyridine, γ-picoline, and 2,6-lutidine, tetraalkylammonium acetates such as tetrabutylammonium acetate, and ionic liquids such as butyl carbitol acetate In addition, the following binders, for example, may be added to the powder material of the metal material or the ceramic material to be charged into the material supply unit 220 as the material MR.

Example of Binder

Acrylic resin, epoxy resin, silicone resin, cellulose-based resin or other synthetic resins or polylactic acid (PLA), polyamide (PA), polyphenylene sulfide (PPS), polyether ether ketone (PEEK) or other thermoplastic resins

B. Other Embodiments (B-1) In the above embodiment, the three-dimensional shaping device 100 includes the cooling mechanism 90, the temperature sensor 80, and the cooling control unit 110. On the other hand, the three-dimensional shaping device 100 may not include the cooling mechanism 90, the temperature sensor 80, and the cooling control unit 110 when a sufficient thermal insulation effect is obtained by the first heat resistant member 70. Alternatively, the three-dimensional shaping device 100 may cool the separation space 71 using the cooling mechanism 90 only without using the temperature sensor 80 and the cooling control unit 110.

(B-2) In the above embodiment, the first drive unit 50 is disposed in the separation space 71. On the other hand, the first drive unit 50 may not be disposed in the separation space 71. Alternatively, the three-dimensional shaping device 100 may not include the separation space 71.

(B-3) In the above embodiment, the heating unit 20 circulates and heats air through the intake pipe 21 and the exhaust pipe 22. On the other hand, the heating unit 20 may be implemented by a heater attached to the partition wall 12 of the chamber 10.

(B-4) In the above embodiment, the shaping control unit 120 controls the second drive unit 60 to move the nozzle 260 to clean the tip end surface 280 of the nozzle 260. On the other hand, for example, a mechanism that moves the cleaning mechanism 130 may be provided, and the mechanism that moves the cleaning mechanism 130 may be controlled by the shaping control unit 120 to clean the tip end surface 280 of the nozzle 260.

(B-5) In the above embodiment, the first drive unit 50 functions as a gauge head moving mechanism. On the other hand, the gauge head moving mechanism may be provided independently of the first drive unit 50. That is, the gauge head moving mechanism may be a mechanism that moves the gauge head 150 independently of the stage 30. For example, an actuator that moves the gauge head 150 along the first direction may be provided independently of the first drive unit 50, and the actuator and the second drive unit 60 may be controlled by the shaping control unit 120 to bring the tip end surface 280 of the nozzle 260 into contact with the gauge head 150, thereby measuring a facing distance. An actuator that moves the gauge head 150 along the second direction may be provided independently of the second drive unit 60.

(B-6) In the above embodiment, the distance measurement mechanism 140 includes the gauge head 150 and the gauge head movement amount detection unit 142, and the shaping control unit 120 measures the facing distance by bringing the gauge head 150 into contact with the tip end surface 280 of the nozzle 260. On the other hand, the distance measurement mechanism 140 may not include the gauge head 150 and the gauge head movement amount detection unit 142. For example, the shaping control unit 120 may measure the facing distance by using a laser distance measurement device. In this case, for example, a distance between the distance measurement device and the tip end surface 280 of the nozzle 260 may be measured by a laser, and the facing distance may be measured based on the measured distance.

(B-7) In the above embodiment, the gauge head movement amount detection unit 142 is a contact displacement sensor. On the other hand, the gauge head movement amount detection unit 142 may be a laser distance measurement device. In this case, for example, the gauge head movement amount detection unit 142 may detect a movement amount of the gauge head 150 based on a change in an imaging position of laser reflected light generated by a change in a distance between the gauge head 150 and the gauge head movement amount detection unit 142.

(B-8) In the above embodiment, the end portion of the tip end portion of the gauge head 150 at the nozzle 260 side is disposed between the stacking surface 31 and the tip end surface 280 of the nozzle 260 in the first direction. On the other hand, for example, the end portion of the tip end portion of the gauge head 150 at the nozzle 260 side may be disposed between the upper wall 72 and the stacking surface 31 in the first direction. In other words, the stacking surface 31 may be disposed between an end portion of the tip end portion of the gauge head 150 at a first nozzle side and the tip end surface 280 of the nozzle 260 in the first direction.

(B-9) In the above embodiment, the gauge head 150 and the stage 30 are independent of each other. On the other hand, the gauge head 150 may be a part of the stage 30. For example, the shaping control unit 120 may measure the facing distance by bringing the nozzle 260 into contact with a part of the stage 30 that is the gauge head.

(B-10) In the above embodiment, the first heat resistant member 70 may have a telescopic structure that is expandable or contractible in the Z direction. In the above embodiment, the second heat resistant member 16 may have a telescopic structure that is expandable or contractible in the second direction. The telescopic structure can also be referred to as a shutter structure.

(B-11) In the above embodiment, after the shaping control unit 120 controls the heating unit 20 to heat the inside of the chamber 10, the cleaning mechanism 130 cleans the tip end surface 280 of the nozzle 260, and the distance measurement mechanism 140 measures the facing distance between the tip end surface 280 of the nozzle 260 and the stacking surface 31. On the other hand, the tip end surface 280 of the nozzle 260 may be cleaned, and the facing distance may be measured without heating the inside of the chamber 10.

(B-12) In the above embodiment, the Vickers hardness of the contact portion 133 of the cleaning member 132 is smaller than the Vickers hardness of the tip end surface 280 of the nozzle 260. On the other hand, the Vickers hardness of the contact portion 133 of the cleaning member 132 may be larger than the Vickers hardness of the tip end surface 280 of the nozzle 260.

(B-13) In the above embodiment, the facing distance L1 between the tip end surface 280 of the nozzle 260 and the stacking surface 31 is calculated as a value relating to the facing distance between the tip end surface 280 of the nozzle 260 and the stacking surface 31. Alternatively, the above-described displacement amount A may be directly calculated as the value relating to the facing distance between the tip end surface 280 of the nozzle 260 and the stacking surface 31. Specifically, the shaping control unit 120 may calculate, as the displacement amount A, a value obtained by subtracting a measured movement amount of the gauge head 150 from an ideal movement amount of the gauge head 150 when the shaping control unit 120 controls the first drive unit 50 to move the gauge head 150 upward by a predetermined distance.

C. Other Aspects

The present disclosure is not limited to the embodiments described above, and can be implemented in various forms without departing from the scope of the present disclosure. For example, the present disclosure can be implemented in the following aspects. In order to solve some or all problems of the present disclosure, or to achieve some or all effects of the present disclosure, technical features in the embodiments described above corresponding to technical features in aspects described below can be replaced or combined as appropriate. The technical features can be deleted as appropriate unless described as essential in the present specifications.

(1) According to a first aspect of the present disclosure, a three-dimensional shaping device is provided. The three-dimensional shaping device includes a nozzle that discharges a shaping material from a discharge port formed on a tip end surface, a stage that includes a stacking surface on which the shaping material is stacked, a distance measurement mechanism that is disposed at a position facing the nozzle, a cleaning mechanism that cleans the tip end surface of the nozzle, and a control unit that controls the distance measurement mechanism to measure a value relating to a facing distance between the nozzle and the stacking surface after the cleaning mechanism cleans the tip end surface of the nozzle.

According to this aspect, the value relating to the facing distance between the tip end surface of the nozzle and the stacking surface is measured after adhered substances on the tip end surface of the nozzle are removed. Accordingly, the value relating to the facing distance can be accurately measured.

(2) In the three-dimensional shaping device according to the aspect described above, the distance measurement mechanism may include a gauge head disposed at a position facing the nozzle, and a gauge head moving mechanism that moves the gauge head. The control unit may control the moving mechanism to bring the gauge head into contact with the tip end surface of the nozzle, and the value relating to the facing distance may be measured based on a movement amount of the gauge head.

According to this aspect, the value relating to the facing distance can be accurately measured by a simple configuration.

(3) In the three-dimensional shaping device according to the aspect described above, an end portion of the gauge head at a nozzle side may be disposed between the stacking surface and the tip end surface of the nozzle in a direction intersecting the stacking surface.

According to this aspect, the nozzle can be prevented from coming into contact with the stage when the value relating to the facing distance is measured by bringing the tip end surface of the nozzle into contact with the gauge head. Accordingly, the value relating to the facing distance can be accurately measured.

(4) The three-dimensional shaping device according to the aspect described above may further include a chamber that has a shaping space, and a cylindrical heat resistance member that is disposed between the stage and a peripheral portion of an opening formed in a partition wall of the chamber, is expandable or contractible along a direction intersecting the stacking surface corresponding to a movement of the stage along the direction intersecting the stacking surface, and forms a separation space separated from the shaping space. The distance measurement mechanism may include a gauge head movement amount detection unit that detects a movement amount of the gauge head. In the distance measurement mechanism, at least a tip end portion of the gauge head may be disposed in the shaping space and the gauge head movement amount detection unit may be disposed in the separation space.

According to this aspect, the gauge head movement amount detection unit can be prevented from being thermally affected. Therefore, the value relating to the facing distance can be accurately measured.

(5) In the three-dimensional shaping device according to the aspect described above, the cleaning mechanism may include a contact portion that can clean the tip end surface of the nozzle by being brought into contact with the tip end surface of the nozzle, and the Vickers hardness of the contact portion may be smaller than the Vickers hardness of the nozzle.

According to this aspect, the nozzle can be prevented from being broken when the cleaning member and the nozzle are brought into contact with each other.

The present disclosure is not limited to the three-dimensional shaping device or the three-dimensional shaped object manufacturing method described above, and may be implemented in various aspects. For example, the present disclosure can be implemented in a form of a three-dimensional shaped object shaping method, a three-dimensional shaping device control method, a computer program for shaping a three-dimensional shaped object, a non-transitory tangible recording medium in which a computer program is recorded, and the like.

What is claimed is:

1. A three-dimensional shaping device comprising:
- a nozzle that discharges a shaping material from a discharge port formed on a tip end surface;
- a stage that includes a stacking surface on which the shaping material is stacked;
- a distance measurement mechanism that is disposed at a position facing the nozzle;
- a cleaning mechanism that cleans the tip end surface of the nozzle; and
- a control unit that controls the cleaning mechanism to clean the tip end surface of the nozzle, and thereafter controls the distance measurement mechanism to measure a value relating to a facing distance between the nozzle and the stacking surface, wherein
- the distance measurement mechanism includes a gauge head that is disposed at a position facing the nozzle, and
- a gauge head moving mechanism that moves the gauge head, wherein
- the control unit controls the gauge head moving mechanism to bring the gauge head into contact with the tip end surface of the nozzle to measure the value relating to the facing distance based on a movement amount of the gauge head.

2. The three-dimensional shaping device according to claim 1, wherein
- an end portion of the gauge head at a nozzle side is disposed between the stacking surface and the tip end surface of the nozzle in a direction intersecting the stacking surface.

3. The three-dimensional shaping device according to claim 1, further comprising:
- a chamber that has a shaping space; and
- a cylindrical heat resistance member that is disposed between the stage and a peripheral portion of an opening formed in a partition wall of the chamber, is expandable or contractible along a direction intersecting the stacking surface corresponding to a movement of the stage along the direction intersecting the stacking surface, and forms a separation space separated from the shaping space, wherein
- the distance measurement mechanism includes a gauge head movement amount detection unit that detects a movement amount of the gauge head, and
- in the distance measurement mechanism,
  - at least a tip end portion of the gauge head is disposed in the shaping space, and
  - the gauge head movement amount detection unit is disposed in the separation space.

4. The three-dimensional shaping device according to claim 1, wherein the cleaning mechanism includes a contact portion that cleans the tip end surface of the nozzle by being brought into contact with the tip end surface of the nozzle, and Vickers hardness of the contact portion is smaller than Vickers hardness of the tip end surface of the nozzle.

* * * * *